US012517948B2

(12) United States Patent
Li et al.

(10) Patent No.: US 12,517,948 B2
(45) Date of Patent: Jan. 6, 2026

(54) INFORMATION PROCESSING METHOD AND DEVICE FOR SORTING MUSIC IN A PLAYLIST

(71) Applicant: BEIJING BYTEDANCE NETWORK TECHNOLOGY CO., LTD., Beijing (CN)

(72) Inventors: Zhenliang Li, Beijing (CN); Yang Li, Beijing (CN); Wujing Xu, Beijing (CN); Wei Zhang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/601,884

(22) PCT Filed: Jul. 15, 2021

(86) PCT No.: PCT/CN2021/106398
§ 371 (c)(1),
(2) Date: Oct. 6, 2021

(87) PCT Pub. No.: WO2022/048323
PCT Pub. Date: Mar. 10, 2022

(65) Prior Publication Data
US 2023/0102697 A1    Mar. 30, 2023

(30) Foreign Application Priority Data

Sep. 1, 2020    (CN) .......................... 202010904488.6

(51) Int. Cl.
*G06F 16/00*    (2019.01)
*G06F 16/638*    (2019.01)
(Continued)

(52) U.S. Cl.
CPC ............ *G06F 16/639* (2019.01); *G06F 16/65* (2019.01); *G06F 16/683* (2019.01)

(58) Field of Classification Search
CPC ....... G06F 16/639; G06F 16/65; G06F 16/683
(Continued)

(56) References Cited

U.S. PATENT DOCUMENTS 6,933,433 B1 *   8/2005   Porteus ................. G06F 16/635
                                                            84/615
2012/0123998 A1 *   5/2012   Heller .................. G11B 27/002
                                                            707/610
(Continued)

FOREIGN PATENT DOCUMENTS

CN    104618815 A    5/2015
CN    104732992 A    6/2015
(Continued)

OTHER PUBLICATIONS

International Search Report and Written Opinion issued Oct. 12, 2021 in International Application No. PCT/CN2021/106398 (10 pages) with English translation (2 pages).
(Continued)

*Primary Examiner* — Raquel Perez-Arroyo

(57) ABSTRACT

Embodiments of the present disclosure provide an information processing method and a device. The method includes: in response to an operation acting on a source music list, obtaining a preset number of pieces of music information from the source music list to form a target playlist, where the music information in the source music list includes identifiers, and the identifiers are used to represent an order of the music information in the source music list; sorting the music information in the target playlist according to the source music list and the identifiers, so that an order of the music information in the target playlist is consistent with the order of the music information in the source music list. In this way,
(Continued)

a user can play songs in a target playlist selected by the user in the order in the source music list, which improves the user's listening experience.

12 Claims, 6 Drawing Sheets

(51) Int. Cl.
    *G06F 16/65*     (2019.01)
    *G06F 16/683*     (2019.01)

(58) Field of Classification Search
    USPC .......................................................... 707/769
    See application file for complete search history.

(56) References Cited

U.S. PATENT DOCUMENTS

2016/0147876 A1* 5/2016 Gilbert .................. G06Q 30/02
                                                          707/765
2018/0197158 A1    7/2018   Smalley et al.
2018/0246962 A1    8/2018   Zhang et al.
2018/0253192 A1*   9/2018   Varadharajan ........ G06F 3/0481

FOREIGN PATENT DOCUMENTS

| CN | 105512275 A | 4/2016 |
|---|---|---|
| CN | 105979399 A | 9/2016 |
| CN | 107526739 A | 12/2017 |
| CN | 112035697 A | 12/2020 |
| KR | 20060011514 A | 2/2006 |

OTHER PUBLICATIONS

First Office Action in Chinese Patent Application No. 202010904488. 6, dated May 20, 2021, with English translation (14 pages).
Office Action issued Sep. 11, 2023 in Indian Application No. 202127044357, with English translation (7 pages).

* cited by examiner

INFORMATION PROCESSING METHOD AND DEVICE FOR SORTING MUSIC IN A PLAYLIST

CROSS-REFERENCES TO RELATED APPLICATIONS

This application is a National Stage of International Application No. PCT/CN2021/106398, filed on Jul. 15, 2021, which claims priority to Chinese patent application No. 202010904488.6, filed on Sep. 1, 2020 and entitled "Information Processing Method and Device". The content of the above applications are hereby incorporated by reference in their entireties.

TECHNICAL FIELD

Embodiments of the present disclosure relate to the field of computer technology, and in particular to an information processing method and a device.

BACKGROUND

In a music App (application), songs are usually showed through a playlist, and the order of the songs in a playlist is elaborately sorted by an album or playlist producer. The order of the songs in the playlist may be designed according to a storyline, or may be designed from the shallower to the deeper according to user auditory experience. User experience is best when a user listens to the songs in the order of the songs in the playlist.

At present, in an existing music App, when a user downloads or collects songs from an existing playlist, the songs are generally sorted in a download list or collection list according to the order of clicking by the user or according to the time when downloading is completed. In this way, when the user listens to the songs in the download list or collection list, the order in which the songs are played will be inconsistent with the order of the songs in the original playlist, resulting in poor listening experience of the user.

SUMMARY

Embodiments of the present disclosure provide an information processing method and a device to make the order of music information in a user's target playlist in a music App consistent with the order thereof in a source music list, so that the user can play music in the target playlist in the order in the source music list, which improves the user's listening experience.

In a first aspect, an embodiment of the present disclosure provides an information processing method, including:
  in response to an operation acting on a source music list, obtaining a preset number of pieces of music information from the source music list to form a target playlist, where the music information in the source music list includes identifiers, and the identifiers are used to represent an order of the music information in the source music list;
  sorting the music information in the target playlist according to the source music list and the identifiers, where an order of the music information in the target playlist is consistent with the order of the music information in the source music list.

In a second aspect, an embodiment of the present disclosure provides an information processing device, including:
  an obtaining module, configured to: in response to an operation acting on a source music list, obtain a preset number of pieces of music information from the source music list to form a target playlist, where the music information in the source music list includes identifiers, and the identifiers are used to represent an order of the music information in the source music list;
  a sorting module, configured to sort the music information in the target playlist according to the source music list and the identifiers, where an order of the music information in the target playlist is consistent with the order of the music information in the source music list.

In a third aspect, according to one or more embodiments of the present disclosure, an electronic device is provided, including: a processor and a memory; where the memory stores computer-executing instructions; and the processor executes the computer-executing instructions stored in the memory, so that the processor executes the information processing method as described in the first aspect and various possible designs of the first aspect.

In a fourth aspect, according to one or more embodiments of the present disclosure, a computer-readable storage medium is provided. The computer-readable storage medium stores computer-executing instructions. When the processor executes the computer-executing instructions, the information processing method as described in the above first aspect and various possible designs of the first aspect is implemented.

In a fifth aspect, according to one or more embodiments of the present disclosure, a computer program product is provided. The computer program product includes a computer program carried on a computer-readable medium, and when the computer program is executed by a processor, the information processing method as described in the above first aspect and various possible designs of the first aspect is executed.

In a sixth aspect, according to one or more embodiments of the present disclosure, a computer program is provided, and when the computer program is executed by a processor, the information processing method as described in the above first aspect and various possible designs of the first aspect is executed. In the information processing method and device provided in the embodiments, a preset number of pieces of music information is obtained from the source music list to form the target playlist, where the music information in the source music list includes the identifiers, and the identifiers are used to represent the order of the music information in the source music list; the music information in the target playlist is sorted according to the source music list and the identifiers, so that the order of the music information in the target playlist is consistent with the order of the music information in the source music list. In this way, a user can play songs in a target playlist selected by the user in the order in the source music list, which improves the user's listening experience.

BRIEF DESCRIPTION OF THE DRAWINGS

In order to more clearly illustrate the technical solutions in embodiments of the present disclosure or the prior art, the following will briefly introduce the drawings that need to be used in the description of the embodiments or the prior art. Obviously, the drawings in the following description are some embodiments of the present disclosure. For those of ordinary skill in the art, other drawings can also be obtained based on these drawings without creative effort.

DESCRIPTION OF EMBODIMENTS

In order to make the purposes, technical solutions and advantages of embodiments of the present disclosure clearer, the technical solutions in the embodiments of the present disclosure will be described clearly and completely in conjunction with the accompanying drawings in the embodiments of the present disclosure. Obviously, the described embodiments are part of the embodiments of the present disclosure, but not all of the embodiments. Based on the embodiments in the present disclosure, all other embodiments obtained by those of ordinary skill in the art without creative effort belong to the protection scope of the present disclosure.

Figure 1:
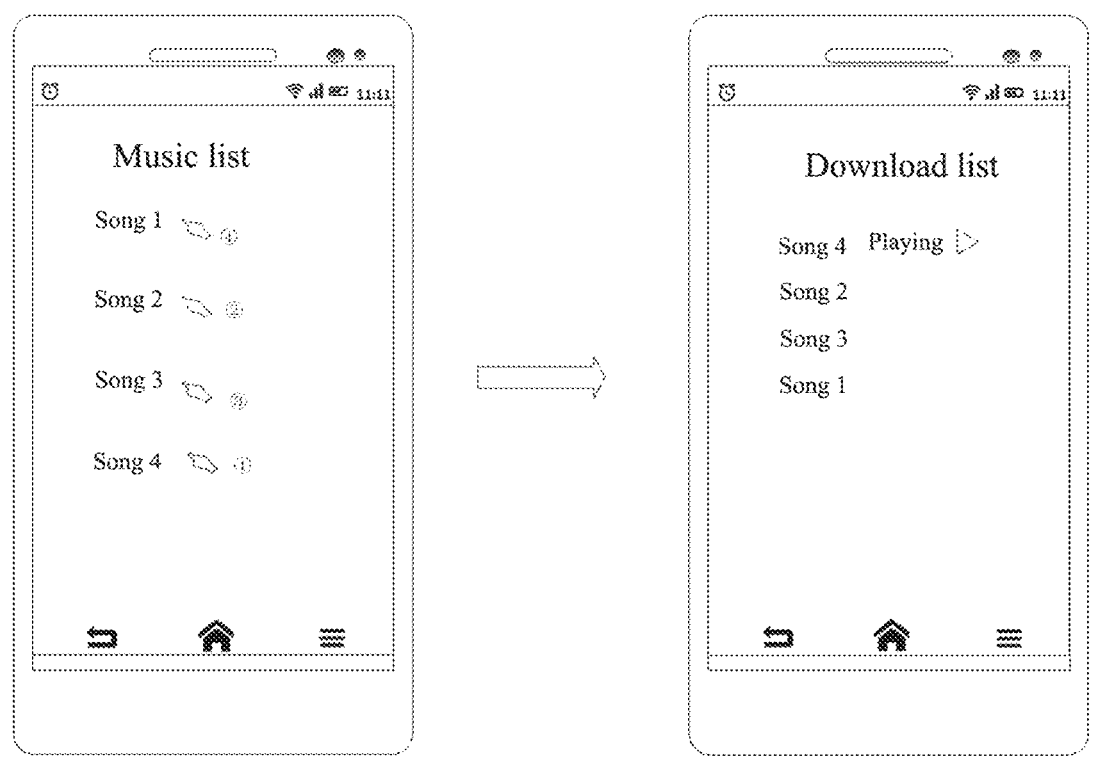
FIG. 1 is a schematic diagram of a scene of downloading songs from a music list in the prior art.

Referring to FIG. 1, FIG. 1 is a schematic diagram of a scene of downloading songs from a music list in the prior art. As shown in FIG. 1, in an existing audio play App, a user clicks songs that he/she wants to select in a music list, as shown in the left interface diagram of FIG. 1. The order of user operations is ①→②→③→④, and the user sequentially selects song 4→song 2→song 3→song 1 to download. At present, sorting in a download list is performed in accordance with the order of downloading or the time when the downloading is completed. As shown in the right interface diagram of FIG. 1, an example of sorting in accordance with the order in which the user clicks to download is given, that is, sorting in accordance with: song 4→song 2→song 3→song 1. When the downloading is completed, and the user plays the songs through the download list, the songs will be sorted in accordance with the order in the download list, and thus the user cannot follow the order, which is elaborately made by an album or playlist producer, of the songs in the music list, resulting in poorer listening experience of the user.

In order to solve the above technical problems in the prior art, the embodiments of the present disclosure provide the following solutions: identifiers are added into music information in a source music list, and the identifiers are used to represent the order of song information in the source music list; a user obtains multiple pieces of music information in the source music list to form a target playlist, and song information selected by the user is sorted according to the identifiers, so that the order of the music information selected by the user in the target playlist is consistent with the order thereof in the source music list. In this way, the user can play songs selected by the user in the order in the source music list, which improves the user's listening experience.

A terminal involved in the present disclosure may be a wireless terminal or a wired terminal. The wireless terminal may refer to a device that provides voice and/or other service data connectivity to the user, a handheld device with a wireless connection function, or other processing devices connected to a wireless modem. The wireless terminal can communicate with one or more core network devices via a radio access network (RAN). The wireless terminal may be a mobile terminal such as a mobile phone (or "cellular" phone) and a computer with a mobile terminal, and for example, may be a portable, pocket-sized, handheld, built-in-computer or vehicle-mounted mobile apparatus, which exchanges language and/or data with a wireless access network. For another example, the wireless terminal may also be a personal communication service (PCS) phone, a cordless phone, a session initiation protocol (SIP) phone, and a wireless local loop (WLL) station, a personal digital assistant (PDA) and other devices. The wireless terminal may also be called a system, a subscriber unit, a subscriber station, a mobile station, a mobile, a remote station, a remote terminal, an access terminal, a user terminal, a user agent, a user device or user equipment, which is not limited here. In an implementation, the above terminal device may also be a device such as a smart watch, a tablet computer, etc. An interface is displayed by running an audio play App installed on the terminal.

Figure 2:
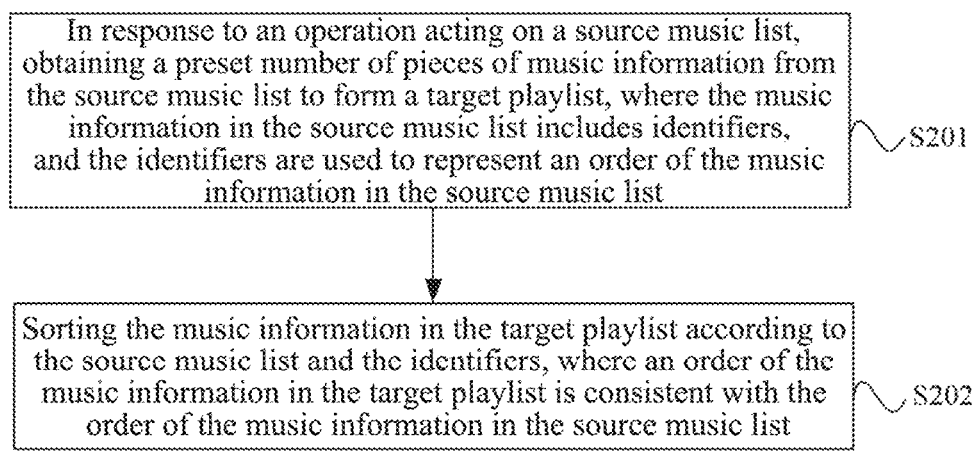
FIG. 2 is a first schematic flowchart of an information processing method provided by an embodiment of the present disclosure.

Referring to FIG. 2, FIG. 2 is a first schematic flowchart of an information processing method provided by an embodiment of the present disclosure. The information processing method in the embodiment of the present disclosure can be applied to the above terminal, and the information processing method includes the following steps.

S201: in response to an operation acting on a source music list, obtaining a preset number of pieces of music information from the source music list to form a target playlist, where the music information in the source music list includes identifiers, and the identifiers are used to represent an order of the music information in the source music list.

In the embodiment of the present disclosure, the source music list may be an album list or a playlist. The target playlist may be a download list or a collection list. That is, the operation acting on the source music list may be a downloading operation or a collecting operation.

The music information may be audio data of any music in the source music list, or may be related information of any music (for example, the name of the music, etc.).

Specifically, in response to the operation acting on the source music list, obtaining the preset number of pieces of music information from the source music list to form the target playlist may be: in response to a users clicks on a preset number of pieces of music in the source music list, obtaining music information corresponding to the preset number of pieces of music from the source music list.

In the embodiment of the present disclosure, the identifiers are added according to the order of the music information in the source music list.

In the embodiment of the present disclosure, an identifier may be a digital identification or a letter identification.

S202: sorting the music information in the target playlist according to the source music list and the identifiers, where an order of the music information in the target playlist is consistent with the order of the music information in the source music list.

In the embodiment of the present disclosure, the source music list may be one or more.

Specifically, the music information in the target playlist is sorted according to the number of the source music list and the identifiers, so that the order of the music information in the target playlist is consistent with the order of the music information in the source music list.

It can be seen from the description of the above embodiment that the preset number of pieces of music information is obtained from the source music list to form the target playlist, where the music information in the source music list includes the identifiers, and the identifiers are used to represent the order of the music information in the source music list; the music information in the target playlist is sorted according to the source music list and the identifiers, so that the order of the music information in the target playlist is consistent with the order of the music information in the source music list. In this way, the user can play songs in the target playlist selected by the user in the order in the source music list, which improves the user's listening experience.

In an embodiment of the present disclosure, the number of the source music list may be one. Specifically, the above step S202 specifically includes: if the source music list is a single music list, sorting, according to the identifiers, the order of the music information in accordance with an order of the music information in the single music list.

In the embodiment of the present disclosure, the single music list is an album list or a song list.

Figure 3:
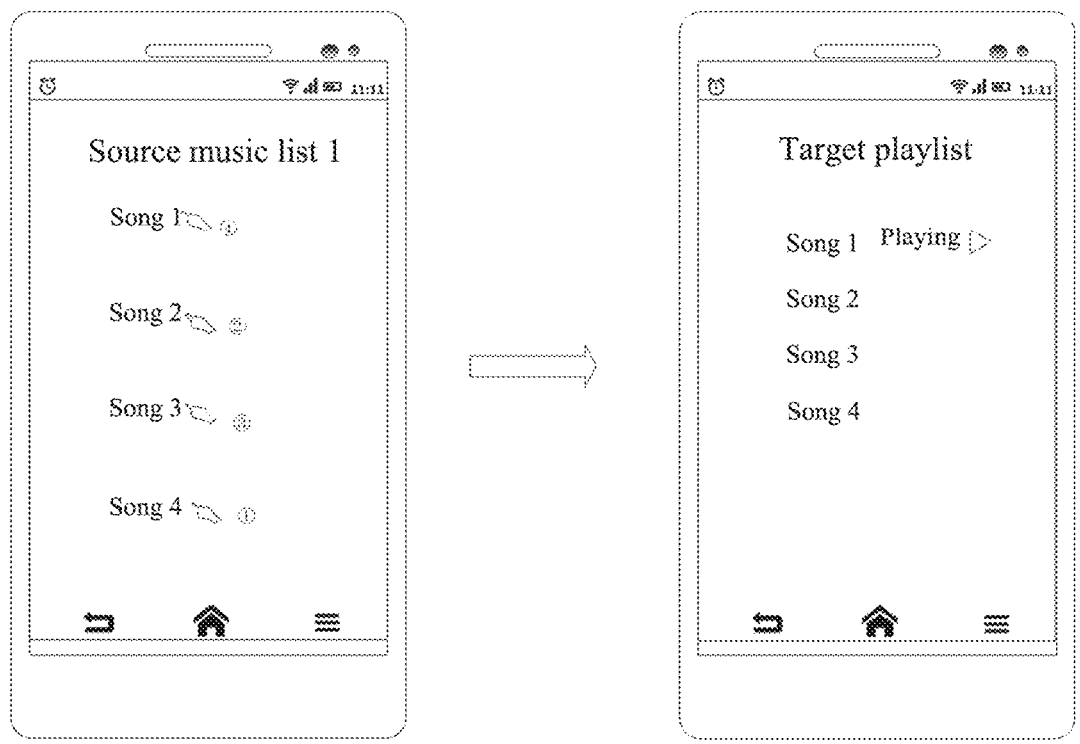
FIG. 3 is a schematic diagram of a scene of downloading songs from a source music list provided by an embodiment of the present disclosure.

Referring to FIG. 3, FIG. 3 is a schematic diagram of a scene of downloading songs from a source music list provided by an embodiment of the present disclosure. In FIG. 3, when the user clicks songs that he/she wants to select in source music list 1, as shown in the left interface diagram of FIG. 3, the order of clicking by the user is ①→②→③→④, and the user sequentially selects song 4→song 2→song 3→song 1 to download. Since song 1 includes identifier "a", song 2 includes identifier "b", song 3 includes identifier "c", and song 4 includes identifier "d", the songs in the downloaded target playlist are sorted in accordance with the order of the identifiers a→b→c→d, to obtain the order of the songs as song 1→song 2→song 3→song 4. In this way, the user can play the songs in the order in source music list 1, which improves the user's listening experience.

It can be seen from the description of the above embodiment that when the source music list operated by the user is the single music list, the order of the music information is sorted in accordance with the order of the music information in the single music list, so that the user can play music in accordance with the order of the music information in the single music list.

Figure 4:
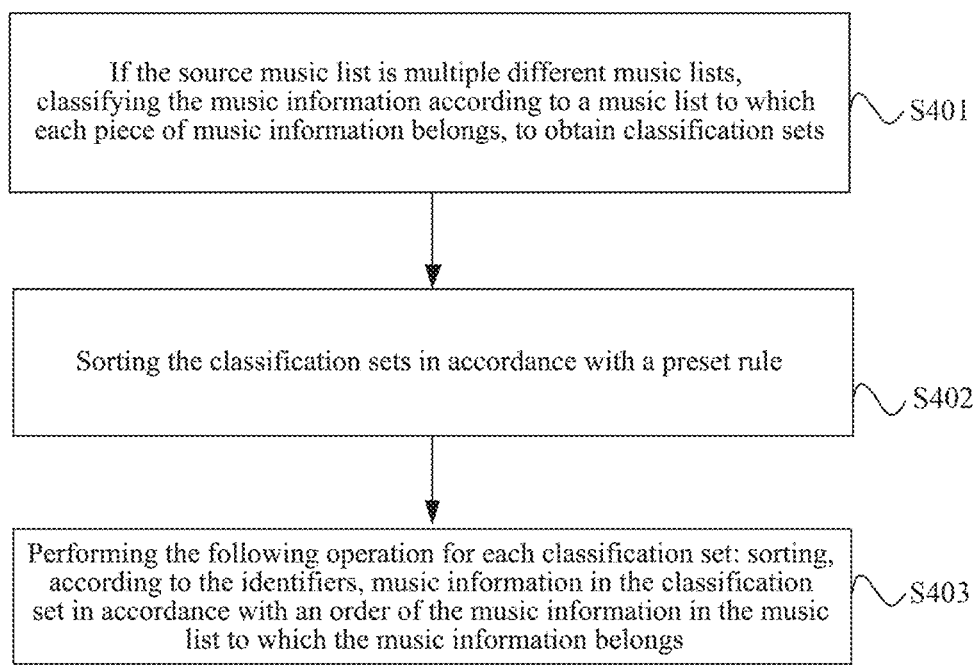
FIG. 4 is a second schematic flowchart of an information processing method provided by an embodiment of the present disclosure.

Referring to FIG. 4, FIG. 4 is a second schematic flowchart of an information processing method provided by an embodiment of the present disclosure. In another embodiment of the present disclosure, there may be multiple source music lists. Specifically, the above step S202 may also specifically include the following steps.

S401: if the source music list is multiple different music lists, classifying the music information in accordance with a music list to which each piece of music information belongs, to obtain classification sets.

In this embodiment, a classification set refers to a set of all music information originating from the same music list in the preset number of pieces of music information.

S402: sorting the classification sets according to a preset rule.

Specifically, the classification sets corresponding to respective music lists can be sorted in accordance with the user's attention degree to the music lists, for example, the classification sets are sorted in accordance with the order of the attention degree from high to low; or the classification sets corresponding to respective music lists are sorted in accordance with the number of pieces of music information obtained by the user, for example, the classification sets are sorted in accordance with the number of pieces of music information in each classification set from more to less.

The attention degree can be determined according to the user's operation frequency on the music lists.

S403: performing the following operation for each classification set: sorting, according to the identifiers, music information in the classification set in accordance with the order of the music information in a music list to which the music information belongs.

In the embodiment of the present disclosure, the music information in each classification set is sorted according to the identifier of each piece of music information in this classification set, so that the order of the music information in this classification set is consistent with the order in the music list to which the music information belongs.

It can be seen from the description of the above described embodiment that the user can select music from multiple source music lists to form the target playlist, and the music information in the target playlist is sorted in accordance with the order of the music information in the source music list, so that when the user plays music from multiple source music lists, they can also follow the order of the source music lists, which improves the user's listening experience.

In an embodiment of the present disclosure, in step S402, the classification sets may be sorted in accordance with operation times when the user acts on the multiple different music lists, where a classification set corresponding to a music list with a later operation time is arranged before a classification set corresponding to a music list with an earlier operation time.

In the embodiment of the present disclosure, the operation times when the user acts on the multiple different music lists is times when the user selects corresponding music information from different music lists through click operations.

Figure 5:
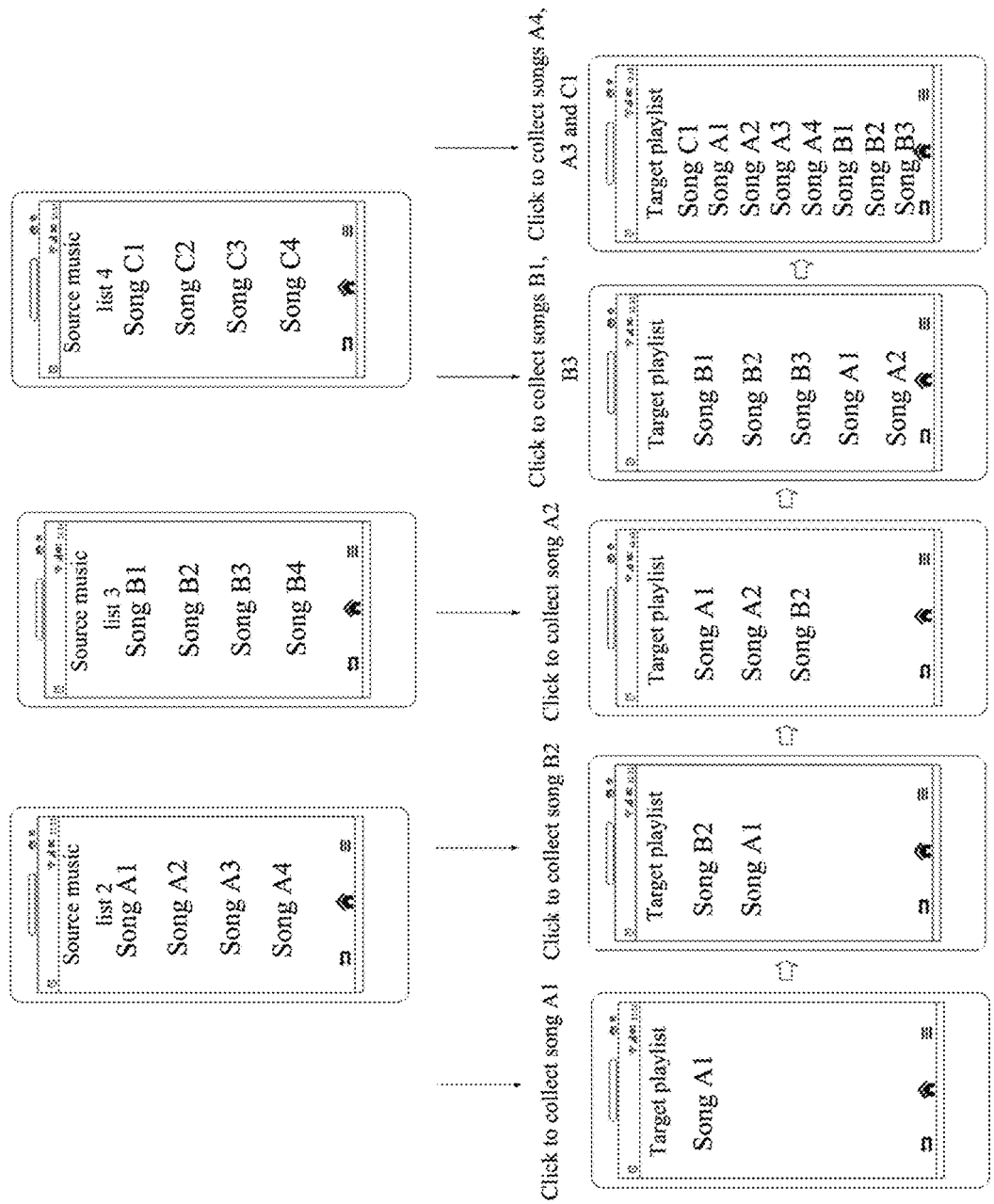
FIG. 5 is a schematic diagram of a scene of collecting songs from a source music list provided by an embodiment of the present disclosure.

Referring to FIG. 5, FIG. 5 is a schematic diagram of a scene of collecting songs from a source music list provided by an embodiment of the present disclosure. In FIG. 5, a source music list includes three music lists, that is, source music list 2, source music list 3, and source music list 4. Among them, source music list 2 includes 4 songs: A1, A2, A3, and A4; source music list 3 includes 4 songs: B1, B2, B3, and B4; source music list 4 includes 4 songs: C1, C2, C3 and C4.

When the user clicks to collect song A1, A1 is displayed in a collected target playlist;

when the user clicks to collect song B2, B2 and A1 are displayed in the collected target playlist (the user's operation on source music list 3 is performed later than the operation on source music list 2, and a classification set corresponding to source music list 3 is arranged before the classification set corresponding to source music list 2);

when the user continues to click to collect song A2, A1, A2, and B2 are displayed in the collected target playlist (the classification set corresponding to source music list 2 is arranged before the classification set corresponding to source music list 3, and the classification set corresponding to source music list 2 is sorted in accordance with the order of source music list 2);

when the user continues to click to collect songs B1 and B3, B1, B2, B3, A1 and A2 are displayed in the collected target playlist;

when the user continues to click to collect songs A4, A3 and C1, C1, A1, A2, A3, A4, B1, B2 and B3 are displayed in the collected target playlist.

It can be seen from the description of the above embodiment that the classification sets are sorted through the operation times when the user operates the music lists, so that the classification set corresponding to the music list that is latest operated by the user is arranged first, which improves the intelligence of music information sorting.

In an embodiment of the present disclosure, a process of adding an identifier to the music information in the music list and updating the identifier is further included. Before step S201, the method further includes the following steps.

S501: obtaining a music list.

S502: adding identifiers to music information in the music list in accordance with an order of the music information in the music list, to obtain the source music list.

In the embodiment of the present disclosure, the music list may be an original album list or a song list released by a producer. Each music list includes music information arranged in a certain order, where the music information in the album list may be arranged in the order designed by a singer, and the music information in the song list may be arranged in the order designed by the producer.

In the embodiment of the present disclosure, the sequential order of the music information in each music list is identified, and the identifiers are added into the music information in accordance with the order. For example, in FIG. 3, the order of the songs in the music list is: song 1→song 2→song 3→song 4, and the identifiers a→b→c→d are respectively added to the music information.

S503: if it is detected that the source music list is updated, re-adding identifiers into music information in the updated source music list in accordance with an order of the music information in the updated source music list.

In the embodiment of the present disclosure, that the source music list is updated includes adding music information or changing the order of original music information in the source music list.

It can be seen from the description of the above embodiment that adding the identifiers in the music information in accordance with the order of the music information in the music list can obtain the source music list more conveniently; at the same time, by re-adding the identifiers to the music information in the updated source music list, it can be ensured that the order of the user listening songs is always dynamically consistent with the updated source music list.

In an embodiment of the present disclosure, if it is detected that the target playlist includes other music information that does not belong to the source music list, then an identifier in the other music information is deleted; if it is detected that the target playlist includes music information that does not carry an identifier, the music information that does not carry the identifier is arranged at the end of the target playlist.

In the embodiment of the present disclosure, the target playlist includes the music information that does not belong to the source music list, which may be the case that an update occurs when music information in the source music list is deleted.

The music information that does not carry the identifier is arranged at the end of the target playlist, where the sorting may be made in accordance with the order in which the user operations are completed. For example, sorting in a reverse order can be made in accordance with the order in which the user clicks to download or the order in which the user clicks to collect, that is, the music information with the later click time of the user is arranged before the music information with the earlier click time of the user.

It can be seen from the description of the above embodiment that the target playlist may include the music information of the source music list, and may also include ordinary music information, so as to meet the diverse needs of the user.

Figure 6:
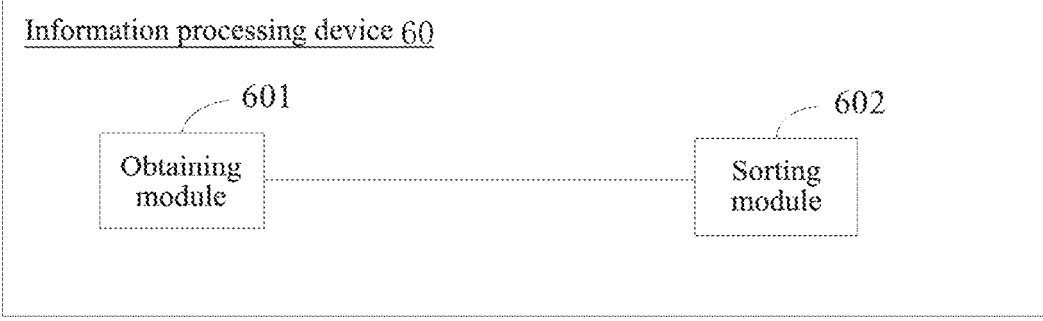
FIG. 6 is a structural block diagram of an information processing device provided by an embodiment of the present disclosure.

Referring to FIG. 6, FIG. 6 is a structural block diagram of an information processing device provided by an embodiment of the present disclosure. For ease of description, only parts related to the embodiments of the present disclosure are shown. Referring to FIG. 6, an information processing device 60 includes: an obtaining module 601 and a sorting module 602.

The obtaining module 601 is configured to: in response to an operation acting on a source music list, obtain a preset number of pieces of music information from the source music list to form a target playlist, where the music information in the source music list includes identifiers, and the identifiers are used to represent an order of the music information in the source music list.

The sorting module 602 is configured to sort the music information in the target playlist according to the source music list and the identifiers, where an order of the music information in the target playlist is consistent with the order of the music information in the source music list.

In an embodiment of the present disclosure, the sorting module 602 is specifically configured to: if the source music list is a single music list, sort, according to the identifiers, the order of the music information in accordance with an order of the music information in the single music list.

In an embodiment of the present disclosure, the sorting module 602 is further specifically configured to: if the source music list is multiple different music lists, classify the music information in accordance with a music list to which each piece of music information belongs, to obtain classification sets; sort the classification sets in accordance with a preset rule; performing the following operation for each classification set: sort, according to the identifiers, music information in the classification set in accordance with an order of the music information in a music list to which the music information belongs.

In an embodiment of the present disclosure, the sorting module 602 is further specifically configured to sort the classification sets in accordance with operation times when the user acts on the multiple different music lists, where a music list corresponding to a classification set with a later operation time is arranged before a classification set corresponding to a music list with an earlier operation time.

In an embodiment of the present disclosure, the obtaining module 601 is further configured to: obtain a music list;

add identifiers into music information in the music list in accordance with an order of the music information in the music list, to obtain the source music list.

In an embodiment of the present disclosure, the obtaining module 601 is further configured to: if it is detected that the source music list is updated, re-add identifiers into music information in the updated source music list in accordance with an order of the music information in the updated source music list.

In an embodiment of the present disclosure, the obtaining module 601 is further configured to: if it is detected that the target playlist includes other music information that does not belong to the source music list, delete an identifier in the other music information; the sorting module 602 is further configured to: if it is detected that the target playlist includes music information that does not carry an identifier, arrange the music information that does not carry the identifier at the end of the target playlist.

The devices provided in the embodiments of the present disclosure can be used to execute the technical solutions of the above method embodiments. Implementation principles and technical effects thereof are similar, and will not be repeated in the embodiments here.

In order to implement the above embodiments, an embodiment of the present disclosure also provides an electronic device.

Figure 7:
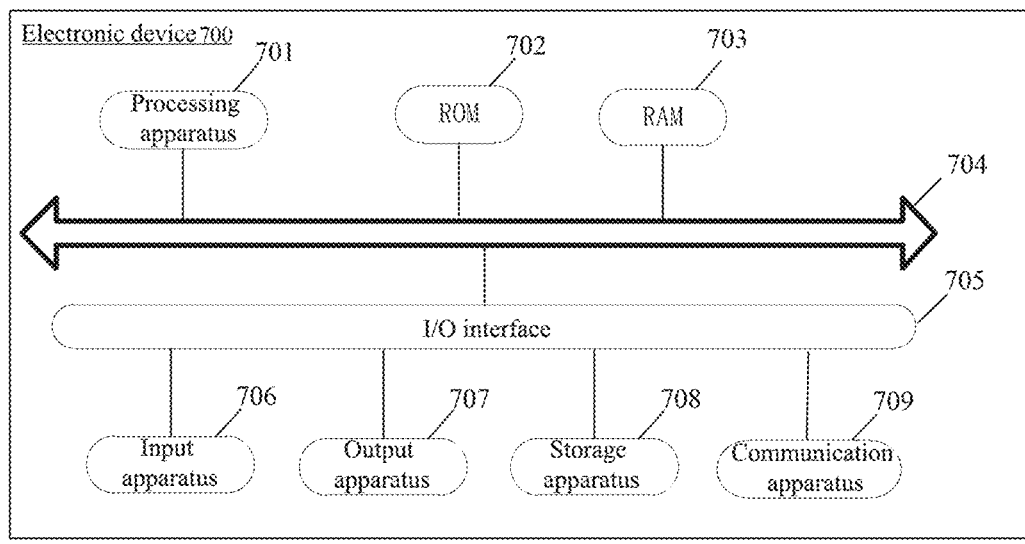
FIG. 7 is a schematic structural diagram of an electronic device provided by an embodiment of the present disclosure.

Referring to FIG. 7, which shows a schematic structural diagram of an electronic device 700 suitable for implementing the embodiments of the present disclosure, the electronic device 700 may be a terminal device or a server. The terminal device may include, but is not limited to, a mobile terminal such as a mobile phone, a laptop, a digital broadcast receiver, a personal digital assistant (PDA), a portable android device (PAD), a portable media player (PMP), a vehicle-mounted terminal (for example, a vehicle navigation terminal), etc., and a fixed terminal such as a digital TV, a desktop computer, etc. The electronic device shown in FIG. 7 is only an example, and should not bring any limitation to the functions and scope of use of the embodiments of the present disclosure.

As shown in FIG. 7, the electronic device 700 may include a processing apparatus (such as a central processing unit, a graphics processor, etc.) 701, which can perform various appropriate actions and processing according to a program stored in a read only memory (ROM) 702 or a program loaded from a storage apparatus 708 into a random access memory (RAM) 703. In the RAM 703, various programs and data required for operations of the electronic device 700 are also stored. The processing apparatus 701, the ROM 702, and the RAM 703 are connected to each other through a bus 704. An input/output (I/O) interface 705 is also connected to the bus 704.

Generally, the following apparatuses can be connected to the I/O interface 705: an input apparatus 706 including, for example, a touch screen, a touch panel, a keyboard, a mouse, a camera, a microphone, an accelerometer, a gyroscope, etc.; an output apparatus 707 including, for example, a liquid crystal display (LCD), a speaker, a vibrator, etc.; a storage apparatus 708 including, for example, a magnetic tape, a hard disk, etc.; and a communication apparatus 709. The communication apparatus 709 can allow the electronic device 700 to perform wireless or wired communication with other devices to exchange data. Although FIG. 7 shows the electronic device 700 having various apparatuses, it should be understood that it is not required to implement or have all of the illustrated apparatuses. More or fewer apparatuses may alternatively be implemented or provided.

In particular, according to an embodiment of the present disclosure, a process described above with reference to a flowchart can be implemented as a computer software program. For example, an embodiment of the present disclosure includes a computer program product, which includes a computer program carried on a computer-readable medium, and the computer program contains program code for executing the method shown in the flowchart. In such an embodiment, the computer program may be downloaded and installed from a network through the communication apparatus 709, or installed from the storage apparatus 708, or installed from the ROM 702. When the computer program is executed by the processing apparatus 701, the above functions defined in the methods of the embodiments of the present disclosure are executed.

It should be noted that the above computer-readable medium in the present disclosure may be a computer-readable signal medium or a computer-readable storage medium, or any combination of the two. The computer-readable storage medium may be, for example, but not limited to, an electrical, magnetic, optical, electromagnetic, infrared, or semiconductor system, apparatus or device, or a combination of any of the above. More specific examples of the computer-readable storage medium may include, but are not limited to: an electrical connection with one or more wires, a portable computer disk, a hard disk, a random access memory (RAM), a read only memory (ROM), an erasable programmable read only memory (EPROM or flash memory), an optical fiber, a portable compact disk-read only memory (CD-ROM), an optical storage device, a magnetic storage device, or any suitable combination of the above. In the present disclosure, the computer-readable storage medium may be any tangible medium that contains or stores a program, and the program may be used by or in combination with an instruction execution system, apparatus or device. In the present disclosure, the computer-readable signal medium may include a data signal propagated in a baseband or as a part of a carrier wave, and a computer-readable program code is carried therein. Such propagated data signal can take many forms, including but not limited to an electromagnetic signal, an optical signal, or any suitable combination of the above. The computer-readable signal medium may also be any computer-readable medium other than the computer-readable storage medium. The computer-readable signal medium can send, propagate, or transmit the program for use by or in combination with the instruction execution system, apparatus, or device. The program code contained on the computer-readable medium can be transmitted using any suitable medium, including but not limited to: an electric wire, an optical cable, a radio frequency (RF), etc., or any suitable combination of the above.

The above computer-readable medium may be included in the above electronic device; or may exist alone without being assembled into the electronic device.

The above computer-readable medium carries one or more programs, and when the above one or more programs are executed by the electronic device, the electronic device is caused to execute the methods shown in the above embodiments.

The computer program code used to perform the operations of the present disclosure may be written in one or more programming languages or a combination thereof. The above programming languages include object-oriented programming languages such as Java, Smalltalk, C++, and also conventional procedural programming languages such as "C" language or similar programming language. The program code can be executed entirely on a user computer, executed partly on the user computer, executed as an independent software package, executed partly on the user computer and partly on a remote computer, or executed entirely on the remote computer or server. In the case involving the remote computer, the remote computer can be connected to the user computer through any kind of network, including a local area network (LAN) or a wide area network (WAN), or can be connected to an outside computer (for example, being connected via the Internet using an Internet service provider).

The flowcharts and block diagrams in the accompanying drawings illustrate possible implementation architectures, functions and operations of the systems, methods and computer program products according to various embodiments of the present disclosure. In this regard, each block in the flowcharts or block diagrams may represent a module, program segment, or part of code, and the module, program segment, or part of code contains one or more executable instructions for implementing the specified logic function. It should also be noted that, in some alternative implementations, the functions marked in the block may also occur in a different order from the order marked in the drawings. For example, two blocks shown in succession can actually be executed substantially in parallel, and they can sometimes be executed in the reverse order, depending on the functions involved. It should also be noted that each block in the block diagrams and/or flowcharts, and the combination of the blocks in the block diagrams and/or flowcharts, can be implemented by a dedicated hardware-based system that performs the specified functions or operations, or can be implemented by a combination of dedicated hardware and computer instructions.

The units involved in the embodiments described in the present disclosure can be implemented in software or hardware. The name of the unit does not constitute a limitation on the unit itself under certain circumstances. For example, the first obtaining unit can also be described as "a unit for obtaining at least two internet protocol addresses".

The functions described above may be performed at least in part by one or more hardware logic components. For example, without limitation, exemplary types of hardware logic components that can be used include: a field programmable gate array (FPGA), an application specific integrated circuit (ASIC), an application specific standard part (ASSP), a system on chip (SOC), a complex programmable logic device (CPLD), etc.

In the context of the present disclosure, a machine-readable medium may be a tangible medium, which may contain or store a program for use by or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above. More specific examples of the machine-readable storage medium would include an electrical connection based on one or more wires, a portable computer disk, a hard disk, a random access memory (RAM), a read only memory (ROM), an erasable programmable read only memory (EPROM or flash memory), an optical fiber, a compact disk-read only memory (CD-ROM), an optical storage device, a magnetic storage device, or any suitable combination of the above.

An embodiment of the present disclosure also provides a computer program that executes the information processing method provided by any one of the above embodiments when being executed by a processor.

The above description is only preferred embodiments of the present disclosure and an explanation of the applied technical principles. Those skilled in the art should understand that the scope of disclosure involved in this disclosure is not limited to the technical solutions formed by the specific combination of the above technical features, and should also cover other technical solutions formed by the arbitrary combination of the above technical features or their equivalent features without departing from the above disclosed concept, for example, a technical solution formed by replacing the above features and the technical features disclosed in the present disclosure having similar functions (but not limited thereto) with each other.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in language specific to structural features and/or logical actions of the methods, it should be understood that the subject matter defined in the claims is not necessarily limited to the specific features or actions described above. On the contrary, the specific features and actions described above are merely exemplary forms of implementing the claims.

What is claimed is:

1. An information processing method, executed by a terminal device, comprising:

displaying an interface by running an application (APP) installed on the terminal device;

receiving an operation instruction of a user clicking the APP on the terminal device;

in response to receiving the operation instruction, wherein the operation instruction comprises an operation acting on a source music list, obtaining a preset number of pieces of music information from the source music list to form a target playlist, wherein the music information in the source music list comprises identifiers, and the identifiers are used to represent an order of the music information in the source music list; and sorting the music information in the target playlist according to the source music list and the identifiers, wherein an order of the music information in the target playlist is consistent with the order of the music information in the source music list;

wherein sorting the music information in the target playlist according to the source music list and the identifiers comprises:

detecting that there are multiple different music lists, and classifying the music information in accordance with a music list to which each piece of music information belongs, to obtain classification sets;

sorting the classification sets in accordance with a preset rule, wherein a classification set refers to a set of all music information originating from one music list in the preset number of pieces of music information; and performing the following operation for each classification set: sorting, according to the identifiers, music information in the classification set in accordance with an order of the music information in a music list to which the music information belongs;

wherein sorting the classification sets in accordance with the preset rule comprises:

receiving multiple different operation instructions of the user clicking the multiple different music lists on the APP;

sorting and displaying the classification sets in accordance with multiple different operation times corresponding to the multiple different operation instructions of the user clicking the multiple different music lists on the APP, wherein a classification set corresponding to a music list with a later operation time is displayed before a classification set corresponding to a music list with an earlier operation time on the interface by running the APP installed on the terminal device;

wherein a sorting result of the target playlist is presented to the user on the interface through the APP, allowing the user to play the target playlist according to the sorting result;

wherein the method further comprises:

detecting that the target playlist comprises other music information that does not belong to the source music list, and deleting an identifier of the other music information, wherein the other music information is music information that is deleted from the source music list when an update occurs in the source music list; and detecting that the target playlist comprises music information that does not carry an identifier, and arranging the music information that does not carry an identifier at the end of the target playlist, wherein an order of the arranging the music information that does not carry the identifier at the end of the target playlist is sorted in a reverse order made in accordance with an order in which the user clicks the APP in the terminal to download or an order in which the user clicks the APP in the terminal to collect.

2. The method according to claim 1, wherein sorting the music information in the target playlist according to the source music list and the identifiers comprises:

detecting that the source music list is a single music list, and sorting, according to the identifiers, the order of the music information in accordance with an order of the music information in the single music list.

3. The method according to claim 1, further comprising:

obtaining a music list; and adding identifiers into music information in the music list in accordance with an order of the music information in the music list, to obtain the source music list.

4. The method according to claim 3, further comprising:

detecting that the source music list is updated, and re-adding identifiers into music information in the updated source music list in accordance with an order of the music information in the updated source music list.

5. The method according to claim 1, wherein the target playlist is a download list or a collection list.

6. An electronic device, comprising:

a processor and a memory;

the memory stores computer-executing instructions; and the processor executes the computer-executing instructions stored in the memory, to cause the processor to:

display an interface by running an application (APP) installed on a terminal device;

receive an operation instruction of a user clicking the APP on the terminal device;

in response to receiving the operation instruction, wherein the operation instruction comprises an operation acting on a source music list, obtain a preset number of pieces of music information from the source music list to form a target playlist, wherein the music information in the source music list comprises identifiers, and the identifiers are used to represent an order of the music information in the source music list; and sort the music information in the target playlist according to the source music list and the identifiers, wherein an order of the music information in the target playlist is consistent with the order of the music information in the source music list;

wherein the processor is specifically caused to:

detect that there are multiple different music lists, and classify the music information in accordance with a music list to which each piece of music information belongs, to obtain classification sets;

sort the classification sets in accordance with a preset rule, wherein a classification set refers to a set of all music information originating from one music list in the preset number of pieces of music information; and perform the following operation for each classification set: sorting, according to the identifiers, music information in the classification set in accordance with an order of the music information in a music list to which the music information belongs;

wherein the processor is specifically caused to:

receive multiple different operation instructions of the user clicking the multiple different music lists on the APP;

sort and display the classification sets in accordance with multiple different operation times corresponding to the multiple different operation instructions of the user clicking the multiple different music lists on the APP, wherein a classification set corresponding to a music list with a later operation time is displayed before a classification set corresponding to a music list with an earlier operation time on the interface by running the APP installed on the terminal device;

wherein a sorting result of the target playlist is presented to the user on the interface through the APP, allowing the user to play the target playlist according to the sorting result;

wherein the processor is further caused to:

detect that the target playlist comprises other music information that does not belong to the source music list, and delete an identifier of the other music information, wherein the other music information is music information that is deleted from the source music list when an update occurs in the source music list; and detect that the target playlist comprises music information that does not carry an identifier, and arrange the music information that does not carry an identifier at the end of the target playlist, wherein an order of the arrange the music information that does not carry the identifier at the end of the target playlist is sorted in a reverse order made in accordance with an order in which the user clicks the APP in the terminal to download or an order in which the user clicks the APP in the terminal to collect.

7. The electronic device according to claim 6, wherein the processor is specifically caused to:

detect that the source music list is a single music list, and sort, according to the identifiers, the order of the music information in accordance with an order of the music information in the single music list.

8. The electronic device according to claim 6, wherein the processor is further caused to:

obtain a music list; and add identifiers into music information in the music list in accordance with an order of the music information in the music list, to obtain the source music list.

9. The electronic device according to claim 8, wherein the processor is further caused to:

detect that the source music list is updated, and re-add identifiers into music information in the updated source music list in accordance with an order of the music information in the updated source music list.

10. The electronic device according to claim 6, wherein the target playlist is a download list or a collection list.

11. A non-transitory computer-readable storage medium, having computer-executing instructions stored therein, wherein when a processor executes the computer-executing instructions, the following operations are implemented:
displaying an interface by running an application (APP) installed on a terminal device;
receiving an operation instruction of a user clicking the APP on the terminal device;
in response to receiving the operation instruction, wherein the operation instruction comprises an operation acting on a source music list, obtaining a preset number of pieces of music information from the source music list to form a target playlist, wherein the music information in the source music list comprises identifiers, and the identifiers are used to represent an order of the music information in the source music list; and
sorting the music information in the target playlist according to the source music list and the identifiers, wherein an order of the music information in the target playlist is consistent with the order of the music information in the source music list;
wherein sorting the music information in the target playlist according to the source music list and the identifiers comprises:
detecting that there are multiple different music lists, and classifying the music information in accordance with a music list to which each piece of music information belongs, to obtain classification sets;
sorting the classification sets in accordance with a preset rule, wherein a classification set refers to a set of all music information originating from one music list in the preset number of pieces of music information; and
performing the following operation for each classification set: sorting, according to the identifiers, music information in the classification set in accordance with an order of the music information in a music list to which the music information belongs;
wherein sorting the classification sets in accordance with the preset rule comprises:
receiving multiple different operation instructions of the user clicking the multiple different music lists on the APP;
sorting and displaying the classification sets in accordance with multiple different operation times corresponding to the multiple different operation instructions of the user clicking the multiple different music lists on the APP, wherein a classification set corresponding to a music list with a later operation time is displayed before a classification set corresponding to a music list with an earlier operation time on the interface by running the APP installed on the terminal device;
wherein a sorting result of the target playlist is presented to the user on the interface through the APP, allowing the user to play the target playlist according to the sorting result;
wherein the following operations are further implemented:
detecting that the target playlist comprises other music information that does not belong to the source music list, and deleting an identifier of the other music information, wherein the other music information is music information that is deleted from the source music list when an update occurs in the source music list; and
detecting that the target playlist comprises music information that does not carry an identifier, and arranging the music information that does not carry an identifier at the end of the target playlist,
wherein an order of the arranging the music information that does not carry the identifier at the end of the target playlist is sorted in a reverse order made in accordance with an order in which the user clicks the APP in the terminal to download or an order in which the user clicks the APP in the terminal to collect.

12. The storage medium according to claim 11, wherein sorting the music information in the target playlist according to the source music list and the identifiers comprises:
detecting that the source music list is a single music list, and sorting, according to the identifiers, the order of the music information in accordance with an order of the music information in the single music list.

* * * * *